Dec. 15, 1964   J. A. JERPBAK   3,161,434
WHEELBARROW SIDE EXTENSION
Filed July 20, 1962   2 Sheets-Sheet 1

James A. Jerpbak
INVENTOR.

BY *[signature]*
Attorneys

Dec. 15, 1964                    J. A. JERPBAK                    3,161,434
                           WHEELBARROW SIDE EXTENSION
Filed July 20, 1962                                          2 Sheets-Sheet 2
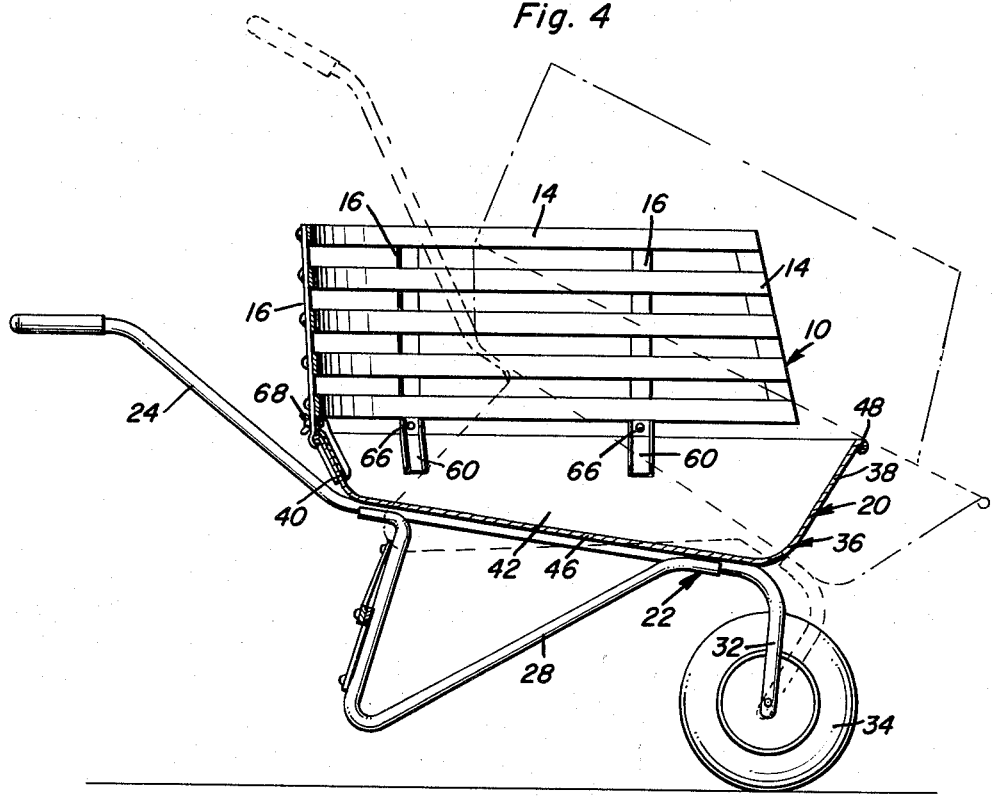
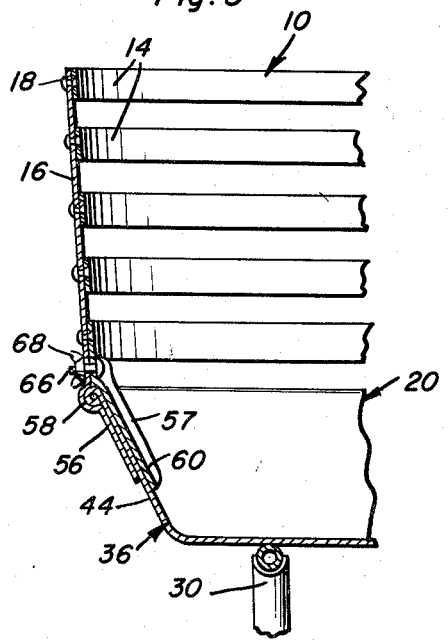
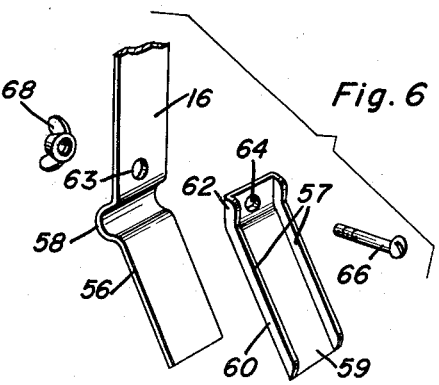
James A. Jerpbak
INVENTOR.
BY
Attorneys

United States Patent Office 3,161,434
Patented Dec. 15, 1964

3,161,434
WHEELBARROW SIDE EXTENSION
James A. Jerpbak, 4890 Londonberry Drive,
Santa Rosa, Calif.
Filed July 20, 1962, Ser. No. 211,281
5 Claims. (Cl. 296—36)

This invention relates to a novel and useful wheelbarrow side extension and more specifically to an extension assembly which may be secured to the rear and opposite side edges of the load pan of a wheelbarrow in order to increase the carrying capacity of the load pan.

While it is not usually desirable to have a wheelbarrow provided with a deep load pan whose high sides would interfere with the loading and unloading of the load pan, in some instances, and particularly where large loads of relatively light material are to be carried, it is beneficial to have a deep load pan.

It is therefore the main object of this invention to provide a wheelbarrow side extension which may be utilized as an attachment for existing wheelbarrow load pans and utilized to temporarily increase the height of the sides and rear wall of the load pan of the wheelbarrow so that a greater load capacity is provided.

Inasmuch as the load pans of wheelbarrows have a capacity equal to the largest load of heavy material a person would want to carry in a wheelbarrow and there would be no need for providing heavily constructed wheelbarrow load pan side extensions to enable larger heavier loads to be carried, it is a further important object of this invention to provide a lightweight extension assembly for the sides of a wheelbarrow load pan which will be fully capable of containing larger loads of lighter materials and which will not appreciably add to the weight of the wheelbarrow.

Still another object of this invention, in accordance with the preceding objects, is to provide a wheelbarrow extension assembly which will readily adapt itself for securement to wheelbarrow load pans of different sizes.

Yet another object of this invention is to provide a wheelbarrow side extension which may be readily removably secured to a wheelbarrow load pan with a minimum of tools.

A still further object of this invention is to provide a wheelbarrow side extension which comprises a one-piece elongated member having a greater width than thickness which is constructed of semi-rigid but resilient material whose resiliency normally urges the side extension assembly from its usual U-shape configuration when secured to a wheelbarrow load pan toward a substantially planar configuration for ease in storage.

A final object of this invention to be specifically enumerated herein is to provide a wheelbarrow side extension in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a vertical longitudinal sectional view taken substantially upon the plane indicated by the section line 4—4 of FIGURE 2;

FIGURE 5 is an enlarged fragmentary transverse vertical sectional view taken substantially upon the plane indicated by the section line 5—5 of FIGURE 2; and FIGURE 6 is a fragmentary exploded perspective view of the wheelbarrow extension securing means more clearly illustrating the structural details of the means by which the wheelbarrow extension may be secured to the load pan of the wheelbarrow.

Figure 1:
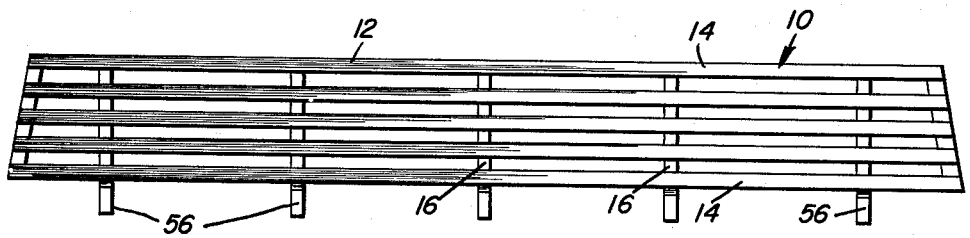
FIGURE 1 is a plan view of the wheelbarrow side extension of the instant invention in its normal planar configuration.

Referring now more specifically to the drawings and to FIGURE 1 in particular it may be seen that the wheelbarrow extension assembly of the instant invention is generally designated by the reference numeral 10. The wheelbarrow extension comprises a one-piece elongated member 12 constructed of a plurality of laterally spaced, generally parallel and longitudinally extending longitudinal strips 14 which are interconnected at points spaced longitudinally along the elongated member 12 by means of laterally spaced and generally parallel transverse strips 16. From FIGURE 5 of the drawing it may be seen that the transverse strips 16 may be secured to the longitudinal strips 14 in any convenient manner such as by fasteners 18.

The wheelbarrow with which the extension assembly 10 is associated is generally referred to by the reference numeral 20 and includes a main frame referred to in general by the reference numeral 22. The main frame 22 includes a pair of depending rear legs 28 and 30, and a depending front wheel support assembly 32 from whose lower end a ground engaging support wheel 34 is rotatably journaled for rotation about an axis extending transversely of the wheelbarrow 20.

A load pan generally referred to by the reference numeral 36 is supported from the main frame 22 and includes a pair of front and rear walls 38 and 40, a pair of opposite side walls 42 and 44 and a bottom wall 46 which interconnects the lower edges of the walls 38, 40, 42 and 44. It will be noted from FIGURES 2, 4 and 5 of the drawings that the walls 38, 40, 42 and 44 are upwardly divergent and that they are continuous and terminate at their upper edges in a circumferentially extending outwardly and downwardly curved reinforcing bead 48.

Figure 2:
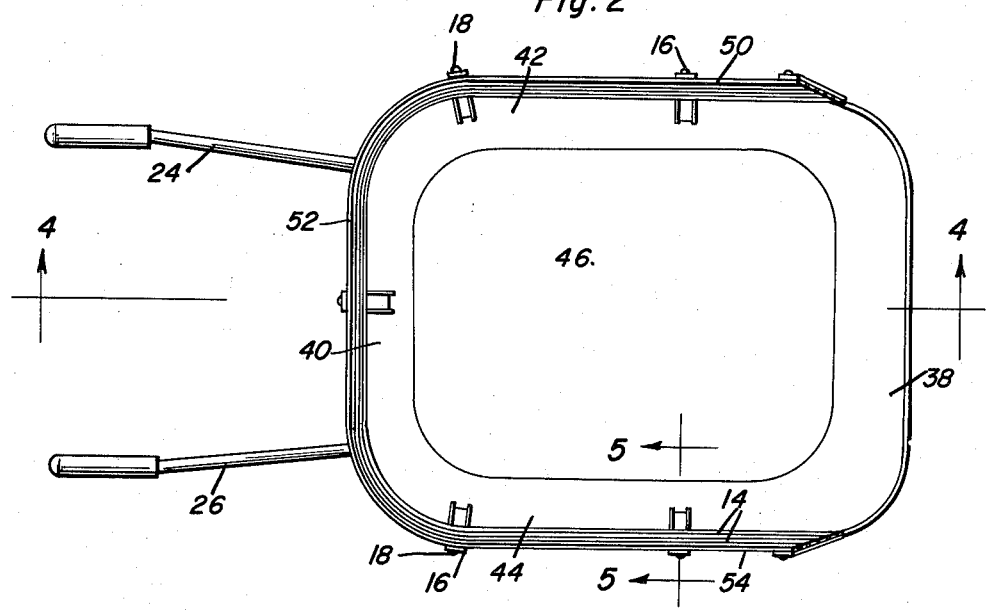
FIGURE 2 is a top plan view of a conventional type of wheelbarrow shown with the side extension assembly of the instant invention mounted thereon.
Figure 3:
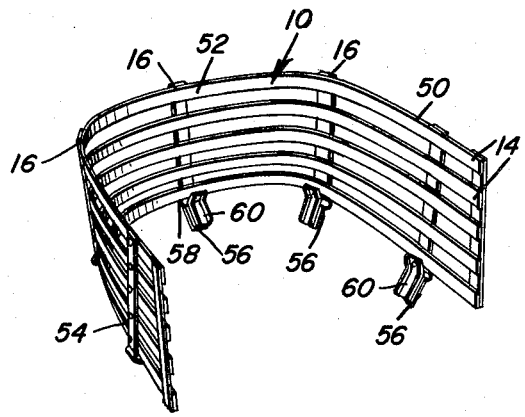
FIGURE 3 is a perspective view of the wheelbarrow extension assembly shown bent into its operational generally U-shaped configuration.

From a comparison of FIGURE 1 with FIGURES 2 through 5 of the drawings, it may be seen that the wheelbarrow extension assembly 10 may be longitudinally bowed from its normal planar configuration into a generally U-shaped configuration including three side portions 50, 52 and 54, see FIGURES 2 and 3.

Each of the transverse strips 16 includes a lower terminal end portion 56 which projects below the lowermost longitudinal strip 14 and is laterally inwardly deflected and provided with an inwardly opening transversely extending groove 58. Each of the transverse strips 16 is apertured as at 63 immediately below the lowermost longitudinal strip 14 and the terminal end portion 56 defines one leg adapted to overlie the outer surfaces of the corresponding side wall of the load pan 36. Each of the legs 56 is provided with a complementary inner leg 60 and each inner leg 60 is generally U-shaped in cross-section including a pair of arms 57 interconnected by means of a bight portion 59 and includes a laterally directed tab portion 62 which is apertured as at 64, see FIGURE 6. Of course, the arms 57 may be omitted if desired and the additional rigidity afforded thereby is not required. The inner legs 60 are adapted to overlie the inner surfaces of the outer legs 56 as can best be viewed in FIGURE 5 of the drawings with the inner legs 60 spaced laterally from the outer legs 56. The apertures 63 and 64 of each pair of corresponding legs 56 and 60 are registrable and a headed shank-type fastener 66 is secured through each pair of aligned or registered apertures 63 and 64 by means of a threaded wing nut 68. Accordingly, it may be seen from FIGURE 5 of the drawings that each pair of legs 56 and 60 defines a downwardly opening channel in which the corresponding upper edge portion of the load pan 36 is receivable. The grooves 58 form inner end portions of the channels defined between each pair of legs 56 and 60 which are enlarged in transverse cross-section.

From FIGURES 4 and 5 of the drawings it may be seen that the bead 48 extending along the upper marginal edge portion of each of the side walls 38, 40, 42 and 44 is interlockingly engaged with the keyhole-shaped channel formed between each pair of legs 56 and 60. When the threaded wing nut 68 is tightened, the corresponding portion of the side extension assembly 10 will be fixedly secured to the associated portion of the load pan 36.

As previously set forth, the wheelbarrow side extension assembly 10 is constructed of lightweight materials and it is to be noted that the longitudinal strips 14 are constructed of resilient material which normally urge the extension assembly 10 toward the planar configuration illustrated in FIGURE 1 of the drawings. Inasmuch as the extension assembly 10 is somewhat flexible and may be readily longitudinally bowed, it may be bent to conform to load pans of varying sizes. In addition, since the extension assembly 10 normally assumes a planar configuration, it may be readily stored in a minimum of space.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a wheelbarrow of the type including an upwardly opening load pan having three adjacent upwardly divergent side walls interconnected at their lower ends by means of a bottom wall and terminating at their upper ends in outwardly and downwardly curled reinforcing beads, a side extension comprising a single elongated member having a greater width than thickness and being disposed on one edge and bent so as to be of generally U-shaped configuration with the lower side edges of the three side portions formed thereby disposed adjacent and generally paralleling the reinforcing beads of said side walls, and mounting means carried by said three side portions defining downwardly opening channels in which the corresponding three side walls of said load pan are received, each of said channels having an innermost portion of greater width than the outer portions thereof so as to define a channel substantially keyhole-shaped in cross-section for interlocking engagement with the associated bead, each of said mounting means including a pair of depending legs between which the corresponding channel is formed, the outermost leg of each of said pairs of legs including an inwardly opening transversely extending groove for surface-to-surface interlocking engagement with the corresponding one of said beads and the adjacent portions of said side walls, the outermost leg of each pair of legs being formed integrally with said elongated member, means removably securing the inner leg of each pair of legs to the corresponding one of said outer legs, the contour of the outer surface of each of said inner legs being such as to conform with the inner surfaces of the adjacent upper portions of said side walls and the adjacent lower portions of said elongated member.

2. The combination of claim 1 wherein said elongated member is constructed of bendable material so that said elongated member may be readily bent to conform to load pan sides of varying length.

3. The combination of claim 1 wherein said legs each project downwardly below the lowermost edges of said side portions.

4. The combination of claim 1 wherein said elongated member comprises a pair of laterally spaced generally parallel longitudinal strips constructed of semi-rigid but resilient material interconnected by means of generally parallel transverse strips spaced longitudinally along said longitudinal strips.

5. The combination of claim 4 wherein the outermost leg of each pair of legs is formed integrally with one of said transverse strips.

References Cited by the Examiner
UNITED STATES PATENTS

| | | | |
|---|---|---|---|
| 706,822 | 8/02 | Haworth | 296—33 |
| 2,711,342 | 6/55 | Selzer | 296—32 |
| 2,805,885 | 9/57 | Elzea | 296—36 |

A. HARRY LEVY, *Primary Examiner.*

PHILIP ARNOLD, *Examiner.*